Figure 1:
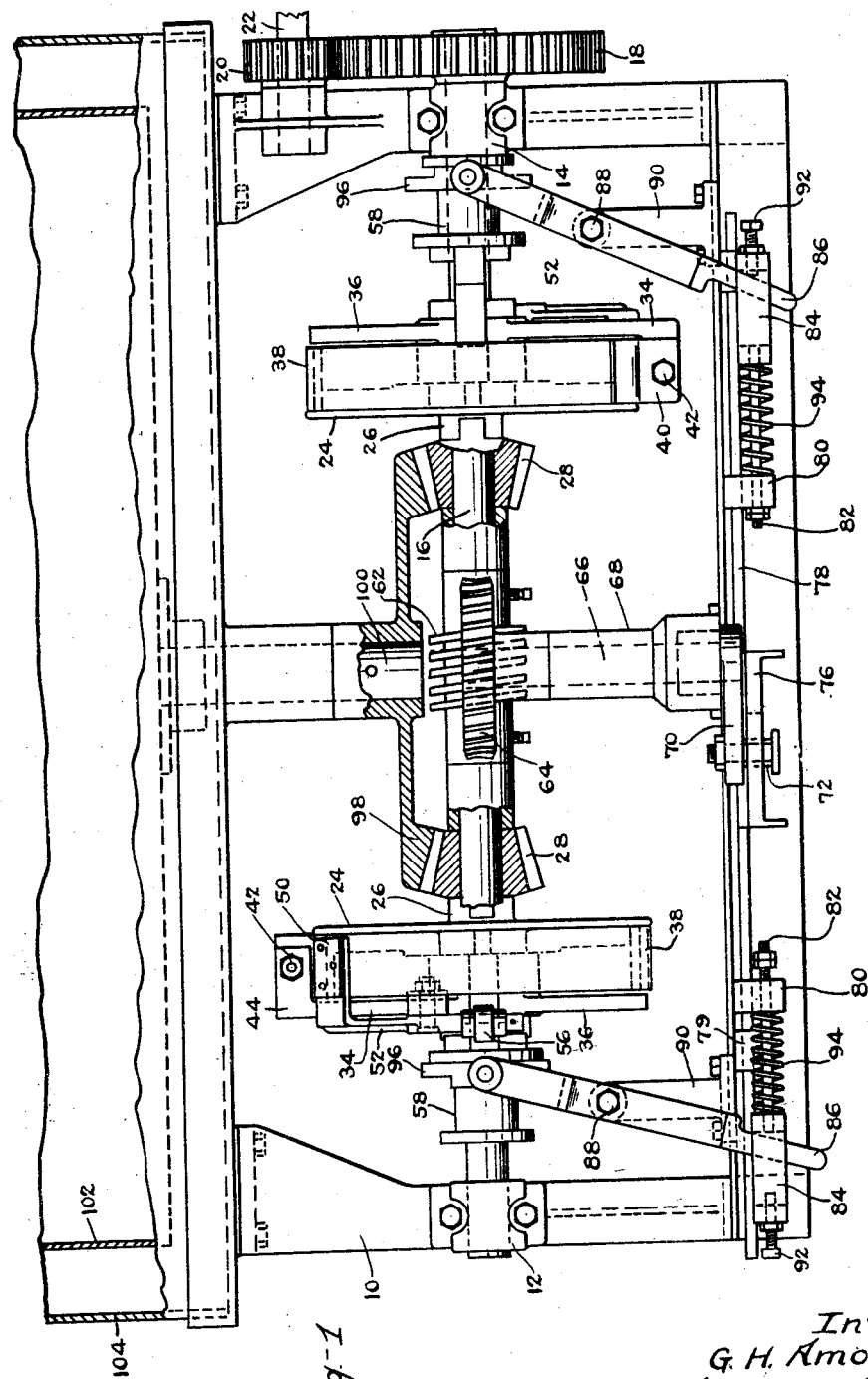

June 5, 1928.

G. H. AMONSEN 1,672,241

MECHANISM FOR CONVERTING ROTARY MOTION INTO OSCILLATORY MOTION

Filed March 11, 1926   3 Sheets-Sheet 1

Inventor:
G. H. Amonsen.
By Whiteley and Ruckman
Attorneys.

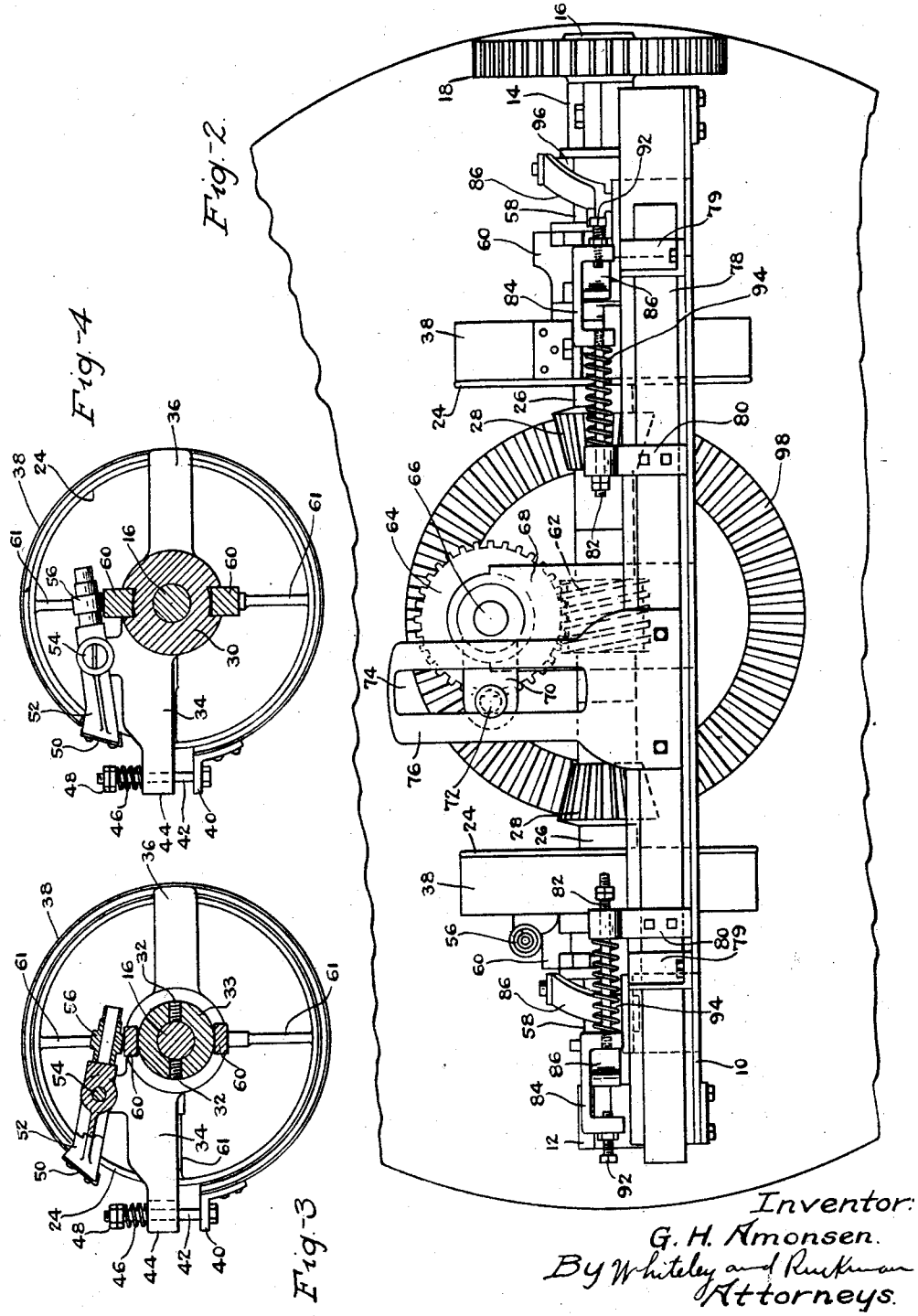

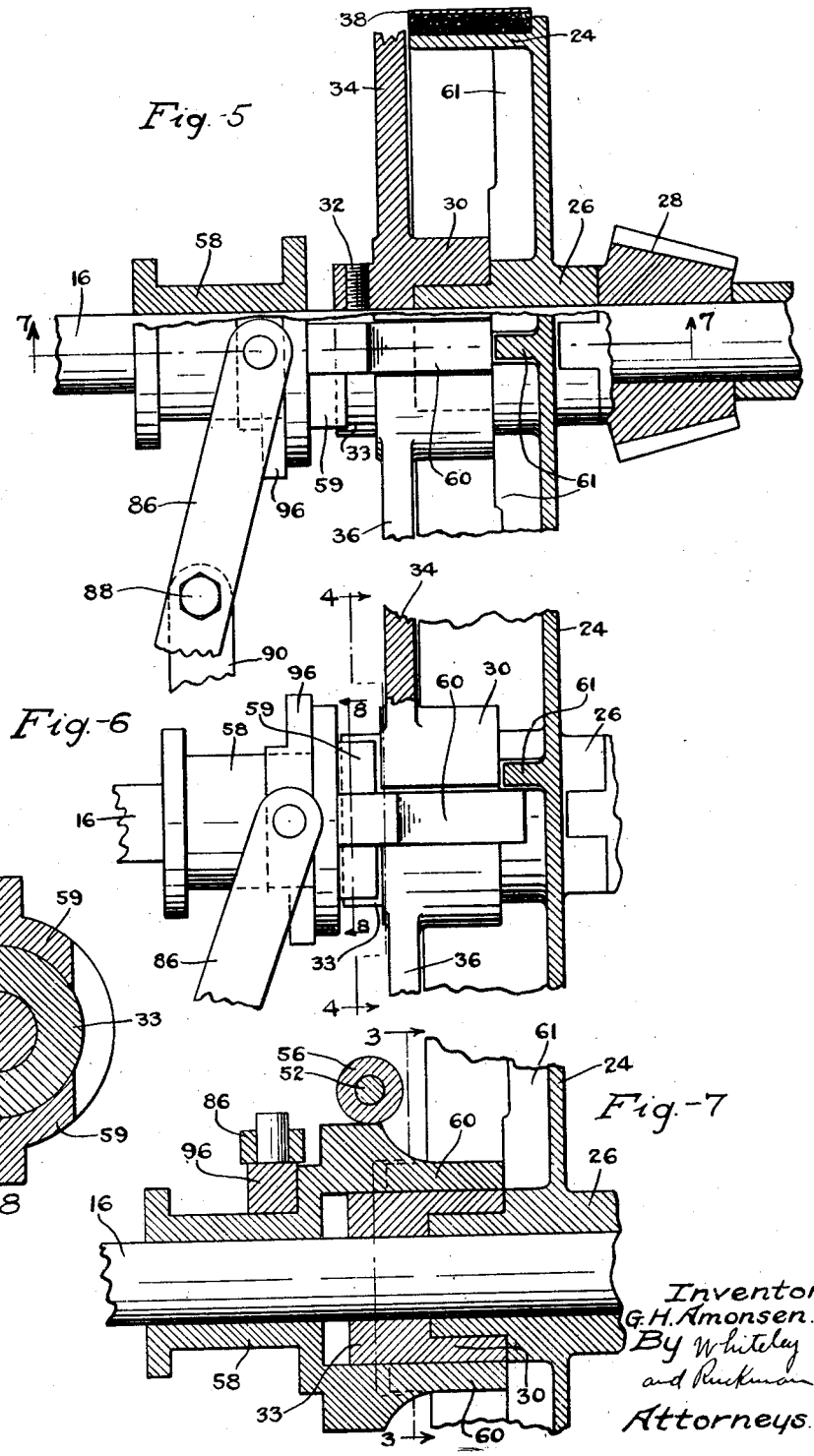

Patented June 5, 1928.

1,672,241

UNITED STATES PATENT OFFICE.

GEORGE H. AMONSEN, OF MINNEAPOLIS, MINNESOTA.

MECHANISM FOR CONVERTING ROTARY MOTION INTO OSCILLATORY MOTION.

Application filed March 11, 1926. Serial No. 93,883.

My invention relates to mechanism for converting rotary motion into oscillatory motion. An object is to provide mechanism of this character by means of which the motion of a rotating shaft may be employed for imparting alternate forward rotation and reverse rotation to a driven member. Another object is to provide mechanism of this character which embodies both frictional and positive clutch devices so arranged that in case the frictional clutch devices slip as they are liable to when spattered with soapy water, then the positive clutch devices are brought into engagement. While my mechanism is intended particularly for use in operating cylinders of laundry washing machines, it is obvious that the mechanism may be used in connection with other machines where it is desired to obtain alternate forward rotation and reverse rotation.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is a view of the mechanism partly in top plan and partly in horizontal section. Fig. 2 is a front elevational view of the mechanism. Fig. 3 is a view in section on the line 3—3 of Fig. 7. Fig. 4 is a view in section on the line 4—4 of Fig. 6. Fig. 5 is an enlarged detailed view of one of the clutch devices. Fig. 6 is a view showing some of the parts in a different position from that shown in Fig. 5. Fig. 7 is a view in section on the line 7—7 of Fig. 5. Fig. 8 is a view in section on the line 8—8 of Fig. 6.

Referring to the construction shown in the drawings, the numeral 10 designates in general a frame which is provided with bearings 12 and 14 for a shaft 16 which may be rotated continuously in one direction by any suitable means. As shown, this shaft has secured to one of its ends a gear 18 in mesh with a smaller gear 20 secured to a shaft 22 which may be rotated in any suitable manner as by a belt or motor. Two similar drums 24 are oppositely disposed in spaced relation around the shaft 16. These drums have hubs 26 to which bevel gears 28 are securely attached, these hubs and gears being loosely mounted on the shaft 16. Collars 30 are secured to the shaft 16 by set screws 32 extending through reduced portions 33 of the collars as shown in Figs. 3 and 5 and the collars have outwardly extending arms 34 and 36, the latter serving merely as guide arms. Bands 38 surround the drums 24. These bands at one of their ends are attached to plates 40 through which pass bolts 42, these bolts also passing through members 44 bent at right angles from the outward ends as will be apparent from Fig. 1. Coiled springs 46 surrounding the bolts 42 are interposed between the members 44 and lock nuts 48 on the ends of the bolts. The other ends of the bands 38 are attached to members 50 bent at right angles from the outer ends of levers 52 pivotally attached at 54 to the arms 34. Rollers 56 are rotatably mounted on the inner ends of the levers 52. Sleeves 58 are slidably mounted on the shaft 16. These sleeves on their inner ends carry guide members 59 and also forwardly extending integrally attached jaws 60 provided with inclined surfaces upon which the rollers 56 ride. It is obvious that when the jaws 60 are moved toward the drums 24, the bands 38 will be tightened around the drums for causing the latter together with the gears 28 to rotate. The jaws 60 slide in grooves in the enlarged portions of the collars 30 and when first slid, are adapted to butt against ribs 61 carried by the web portions of the drums 24. Secured to the shaft 16 between the two gears 28 is a worm 62 which meshes with a worm gear 64 secured to a shaft 66 mounted in a bearing 68 secured to the frame. Secured to the outer end of the shaft 66 is an arm 70 upon the free end of which is mounted a roller 72 which works in a vertical slot 74 formed in an arm 76 secured to a horizontal bar 78 slidably mounted in brackets 79 carried by the frame. Secured to the bar 78 are blocks 80 having openings in their upper ends through which bolts 82 slidably extend. Secured to the outer ends of these bolts are yoke members 84 having downwardly extending branches between which extend the outer ends of levers 86 pivoted at 88 to brackets 90 carried by the frame. The outer ends of the yoke members 84 are provided with set bolts 92 which constitute adjustable engaging members for the outer ends of the levers 86. Coiled springs 94 surround the bolts 82 between the members 84 and the blocks 80 for a purpose which will presently appear. The inner ends of the levers 86 are pivotally attached to shifter blocks 96 adapted to slide in circumferential grooves in the sleeves 58. The two bevel gears 28 mesh with a crown gear 98 secured to the forward end of a shaft 100. In the embodiment shown in Fig. 1, the shaft 100 is secured to a cylinder or clothes holding receptacle 102 contained in the casing 104 of a laundry washing machine.

The operation and advantages of my invention will be understood in connection with the foregoing description. Rotation of the shaft 16 will cause rotation of the shaft 66 through the worm gearing 62 and 64. The arm 70 secured to the end of the shaft 66 will reciprocate the sliding bar 78. When this bar is moved into the position shown in Fig. 1, the left hand lever 86 causes the sleeve 58 carrying the jaws 60 to move toward the drum 24. The jaws 60 slide in grooves in the collar 30 while the guide members 59 slide over the reduced portion 33 of the collar. The roller 56 rides up the inclined surface of one of the jaws 60 as shown in Fig. 7 and the ends of the jaws butt against the ribs 61 as shown in Fig. 5. The band 38 is by the movement of the lever 52 tightened around the drum 24 as shown in Fig. 4 which tends to rotate the drum. At the same time, the spring 94 is placed under tension as shown in Fig. 1 so that if there is any appreciable slipping of the band on the drum, then as soon as the jaws 60 move off the edges of the ribs 61, the tension exerted by the spring 94 will cause a further forward movement of the jaws into the position shown in Fig. 6 so that the drum 24 will now be positively driven on account of the engagement of the jaws with the sides of the ribs 61. Rotation of the drum 24 and gear 28 causes rotation of the gear 98 and the shaft 100. The slot 74 is wider than the diameter of the roller 72 so as to cause a dwell of the arm 76. Continued rotation of the gear 64 causes the arm 76 and the bar 78 to move toward the right, thereby causing disengagement of the clutching members from the left hand drum and engagement of the clutching members with the right hand drum so that the direction of rotation of the shaft 100 will be reversed. It is obvious that the number of rotations imparted to the shaft 100 before its direction of rotation is reversed may be readily varied upon changing the gear relationship.

I claim:

1. Mechanism of the class described comprising a rotatable shaft, two clutch devices each having a member loose on said shaft and a member fast on said shaft, gears secured for rotation respectively with said loose members, a gear constantly in mesh with said gears, a shaft to which said second mentioned gear is secured, means for rotating said first mentioned shaft in one direction, a third shaft, gearing between said first mentioned shaft and said third mentioned shaft, a crank arm secured to said third mentioned shaft, a slidable bar, an arm secured to said bar having a slot therein, a projection secured to said crank arm and working in said slot, blocks secured to said bar toward the two ends thereof, bolts slidably mounted in said blocks, yoke members secured to the outer ends of said bolts, coiled springs surrounding said bolts between said blocks and said yoke members, intermediately pivoted levers having their outer ends extending between the branches of said yoke members, shifter blocks attached to the inner ends of said levers and slidably mounted on said first mentioned shaft, and connections between said shifter blocks and said fast members whereby the latter are engaged with said loose members in alternation.

2. Mechanism of the class described comprising a rotatable shaft, two clutch devices each having a member loose on said shaft and a member fast on said shaft, gears secured for rotation respectively with said loose members, a gear constantly in mesh with said gears, a shaft to which said second mentioned gear is secured, means for rotating said first mentioned shaft in one direction, a third shaft, gearing between said first mentioned shaft and said third mentioned shaft, a crank arm secured to said third mentioned shaft, a slidable bar, an arm secured to said bar having a slot therein, a projection secured to said crank arm and working in said slot, blocks secured to said bar toward the two ends thereof, bolts carried by said blocks, yoke members secured to the outer ends of said bolts, intermediately pivoted levers having their outer ends extending between the branches of said yoke members, shifter blocks attached to the inner ends of said levers and slidably mounted on said first mentioned shaft, and connections between said shifter blocks and said fast members whereby the latter are engaged with said loose members in alternation.

3. Mechanism of the class described comprising a rotatable shaft, two clutch devices each having a member loose on said shaft and a member fast on said shaft, gears secured for rotation respectively with said loose members, a gear constantly in mesh with said gears, a shaft to which said second mentioned gear is secured, means for rotating said first mentioned shaft in one direction, a third shaft, gearing between said first mentioned shaft and said third mentioned shaft, a crank arm secured to said third mentioned shaft, a slidable bar, an arm secured to said bar having a slot therein, a projection secured to said crank arm and working in said slot, blocks secured to said bar toward the two ends thereof, yoke members connected with said blocks, intermediately pivoted levers having their outer ends extending between the branches of said yoke members, shifter blocks attached to the inner ends of said levers and slidably mounted on said first mentioned shaft, and connections between said shifter blocks and said fast members whereby the latter are engaged with said loose members in alternation.

4. Mechanism of the class described comprising a rotatable shaft, two clutch devices each having a member loose on said shaft and a member fast on said shaft, gears secured for rotation respectively with said loose members, a gear constantly in mesh with said gears, a shaft to which said second mentioned gear is secured, means for rotating said first mentioned shaft in one direction, a third shaft, gearing between said first mentioned shaft and said third mentioned shaft, a crank arm secured to said third mentioned shaft, a slidable bar, an arm secured to said bar having a slot therein, a projection secured to said crank arm and working in said slot, intermediately pivoted levers having their outer ends connected with the ends of said bar respectively, shifter blocks attached to the inner ends of said levers and slidably mounted on said first mentioned shaft, and connections between said shifter blocks and said fast members whereby the latter are engaged with said loose members in alternation.

5. Mechanism of the class described comprising a rotatable shaft, two clutch devices each having a member loose on said shaft and a member fast on said shaft, gears secured for rotation respectively with said loose members, a gear constantly in mesh with said gears, a shaft to which said second mentioned gear is secured, means for rotating said first mentioned shaft in one direction, a third shaft, gearing between said first mentioned shaft and said third mentioned shaft, a crank arm secured to said third mentioned shaft, a slidable bar, an arm secured to said bar having a slot therein, a projection secured to said crank arm and working in said slot, intermediately pivoted levers having their outer ends connected with the ends of said bar respectively, and connections between the inner ends of said levers and said fast members whereby the latter are engaged with said loose members in alternation.

In testimony whereof I hereunto affix my signature.

GEORGE H. AMONSEN.